Inventor
William E. Brill
By Willits, Helmig & Baillio
Attorneys

United States Patent Office 2,730,085
Patented Jan. 10, 1956

2,730,085

CYLINDER HEAD

William E. Brill, Cleveland, Ohio, assignor to General Motors Corporation, Detroit, Mich., a corporation of Delaware Application December 19, 1950, Serial No. 201,663

10 Claims. (Cl. 123—41.76)

This invention generally relates to internal combustion engines and more particularly to improvements in cylinder heads therefor.

The high explosion pressure and heat developed in the combustion chamber and heat of the exhaust gases therefrom passing through the exhaust gas passages in the cylinder head particularly in engines of the compression ignition type requires thick walls in the cylinder heads between the engine combustion chamber and the coolant spaces therein if these heads are of cast iron and provided with cored gas and coolant passages. Most of the conventional cast iron cylinder heads are also provided with heavy reinforcing ribs to withstand the explosion pressure applied thereto. Thermic stresses are imposed to these thick walls and reinforcing ribs causing cracks to develop therein. Stresses are also set up in these walls and ribs during the casting of these cast iron cylinder heads and often the cores for the cylinder head passages shift in the mold causing a reduction in the area of these passages and wall thickness of these passages. This causes a decrease in the volumetric efficiency of the engine and also causes hot spots in the head at higher stress at these spots.

The object of the present invention is to overcome these defects present in the conventional cast iron heads by providing a cylinder head comprising suitably formed superimposed cast or forged steel plates, joined by fused metal, for example, brazing and/or welding to provide accurately formed gas and coolant passages having walls of proper thickness to withstand the explosion pressure and temperature in the engine combustion chamber.

The cylinder head construction by which the above object is accomplished will become apparent by reference to the following detailed description and the accompanying drawings, illustrating a cylinder head construction which is particularly adapted to two-stroke uniflow scavenged internal combustion engines of the compression ignition type.

Figure 1 of the drawings is a vertical sectional view of the cylinder head taken on line 1—1 of Figure 2.

Figure 3:
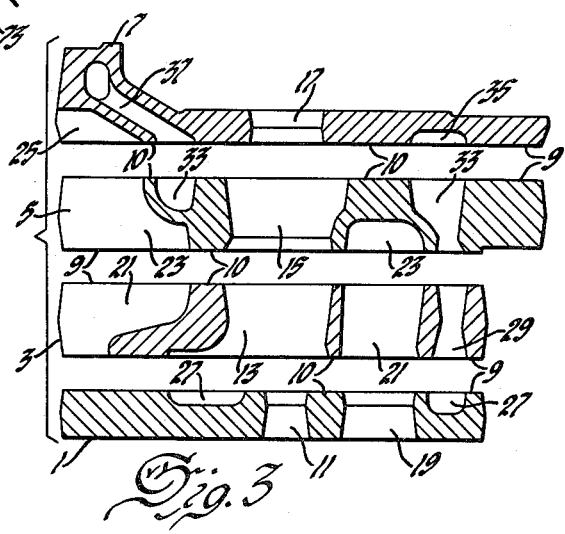
Figure 3 is an exploded side view in section of the formed steel plates before joining thereof by welding or brazing to form the cylinder head assembly.

As best illustrated in Figure 3, the cylinder head comprises four steel plates 1, 3, 5 and 7 formed by casting or welding and provided with adjacent, engaging, parallel, seating surface portions 9 extending part way around the edges of the plates and seating surface portions 10 at the center of the plates preferably joined by fused metal, for example, by welding and/or brazing. The central engaging portions of the plates are provided with aligned central openings 11, 13, 15 and 17 in the central seating surface portions 10 to form part of a coolant space. Four openings 19, forming gas ports, are spaced around the central opening 11 in the plate 1, the exterior surface of which forms the outer end wall of the combustion chamber of the engine cylinder. The openings 19 register with registering recesses 21, 23 and 25 formed between the seating surfaces 10 of the plates 3, 5 and 7 extending around the central openings and within the edge seating portions 9 therein to form an annular gas passage. Additional registering recesses 27, 29, 33, 35 and 37 are also formed in the edge seating surfaces 9 of the plates 1, 3, 5 and 7 and these recesses extend around the recesses 21, 23 and 25 and communicate with the central openings 11, 13, 15 and 17 in the plates to form a water jacket space around the openings or gas ports 19 and recesses 21, 23 and 25 forming the gas port and passages.

Figure 1:
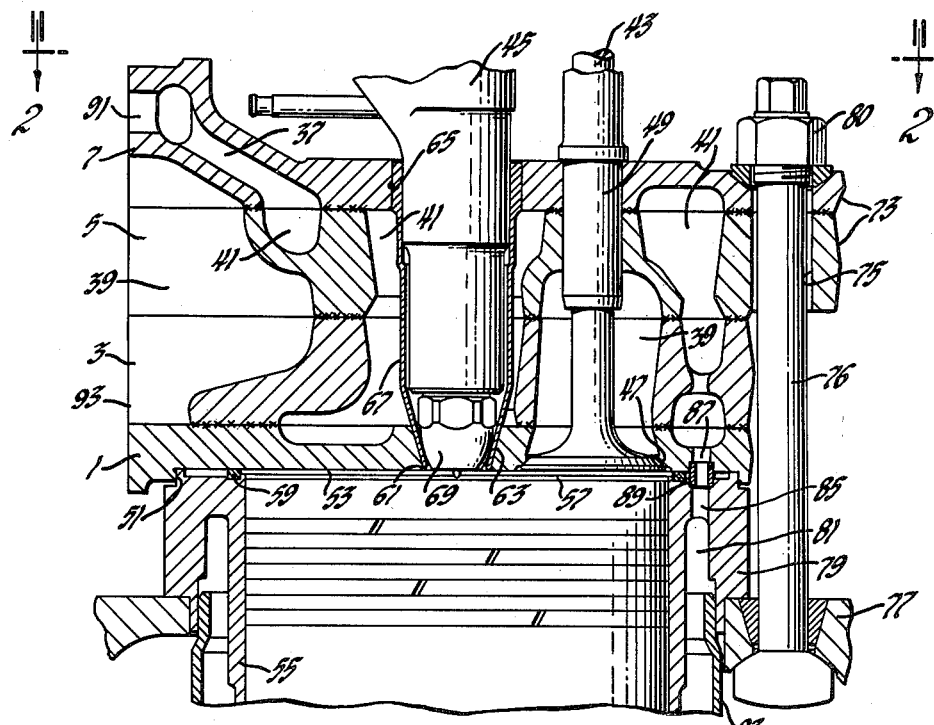

The edge and central seating surface portions 9 and 10 of the plates are finished machined and are shown in Figure 1, joined by fused metal, for example, by welding and/or brazing so that the openings 19 in the plate 1 register with the registering recesses 21, 23 and 25 in the plates 3, 5 and 7 and form an annular gas passage indicated by the reference character 39 in the cylinder head assembly. The coolant jacket space for this annular gas passage 39 is indicated generally in Figure 1 by the reference character 41, and as will be seen from inspection of Figure 3, is formed by the annular recess 27 of plate 1, communicating with the opening 13 and recess 29 of plate 3, the opening 15 and recess 33 of plate 5, and the recess 35 of plate 7 when the several plates are assembled.

Figure 2:
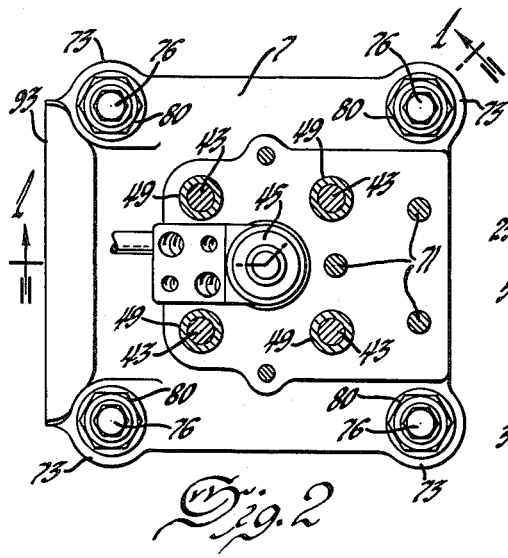
Figure 2 is a top plan view of the cylinder head.

The cylinder head assembly, shown best in Figure 1, is provided with four poppet valves 43 and a unit fuel injection pump 45. The four openings 19 in the plate 1 are machined to provide four valve seats 47. The heads of the valves 43 cooperate with these valve seats and the stems of these valves are mounted for reciprocation in guide bushings 49 pressed in openings drilled in the plates 5 and 7 in alignment with the valve seats 47, as best shown in Figures 1 and 2.

The inner cylinder plate 1 is shown in Figure 1 provided with a counterbore 51, the bottom surface 53 of which is shown seated on the outer end face of an engine cylinder liner 55 and forms the outer end surface of the engine combustion chamber 57. A sealing gasket 59 is placed between the bottom surface 53 of the cylinder head counterbore 51 and the outer end surface of the cylinder liner 55.

The combustion chamber end of the central opening 11 in the inner cylinder head plate 1 is countersunk at 61 and a tapered seat 63 is machined in the opposite end of this opening. The central opening 17 in the outer plate 7 is provided with an enlarged diameter bore 65 in alignment with the seat 63 in the inner plate 1. The inner tapered end of an injector mounting sleeve 67 is seated on the seat 63 when the larger diameter outer end of this sleeve is pressed into bore 65 and the inner tapered end of the sleeve is spun into the countersunk portion 61 adjacent the seat 63 of the cylinder head plate 1. The intermediate portion of the sleeve extends through the enlarged diameter openings 13 and 15 of the plates 3 and 4 and coolant is circulated around this sleeve and through the central openings 13 and 15 of the intermediate plates 3 and 4. The tapered portion of a fuel nozzle retaining nut 69 of the fuel injection pump 45 is retained seated on the inner tapered portion of the sleeve 67 by suitable hold-down means, not shown, attached by studs 71 threaded in to the outer cylinder head plate 7, as best shown in Figure 2.

The adjacent outer plates 5 and 7 are provided with adjacent, outwardly extending, ear portions 73. Aligned openings 75 are provided in these ear portions and hold-down bolts 76 extend through the openings 75 in the ears 73 and also through openings aligned therewith in a flange 77 of the engine frame having an opening through which the cylinder liner 55 extends. An external flange 79 is provided on the outer end of the cylinder liner 55 and this flange engages the engine frame flange 77. The heads of the hold-down bolts 76 engage the engine frame flange 77 and nuts 80 threaded on the hold-down bolts 76 engage washers thereon in contact with the ear portions 73 of the cylinder head assembly to retain the assembly in contact with the cylinder liner 55 and the liner flange 79 seated on the engine frame flange 77.

The cylinder liner flange 79 is provided with an annular groove 81 and a coolant jacket sleeve 83 is pressed into this groove. Coolant outlet holes 85 extend from the bottom of the groove 81 in the flange 79 to the outer end face of the cylinder liner and holes 87 are drilled in the inner plate 1 of the cylinder head and these holes extend to the coolant space 41 therein and register with the coolant outlet holes 85 in the cylinder liner flange 79. The registering ends of the coolant holes 85 and 87 in the cylinder liner and head are counterbored and ferrules 89 are located therein. Coolant from the cylinder liner passes through the holes 85 and 87 and ferrules 89 to the coolant jacket space 41 in the cylinder head assembly. Coolant outlet holes 91 are drilled in the cylinder head plate 7 and extend into the coolant space 41 therein formed by the recess 37 in this plate.

The adjacent side surfaces of the plates are faced off at 93 where the gas passage 39 extends to the edges of the plates 3, 5 and 7 to provide seat surface for attachment of a jacket gas manifold, not shown, communicating with the gas passage 39 in the cylinder head assembly. The coolant jacket of the manifold communicates with coolant outlet holes 91 in the outer cylinder head plate 17 and the holes 91 open into the coolant jacket space 41 of the cylinder head.

The above described cylinder head assembly provides accurately formed gas and coolant passages therein having walls of uniform thickness to withstand the high explosion pressure and temperature present in the combustion chambers of internal combustion engines of the compression ignition type.

I claim:

1. An engine cylinder head comprising a plurality of formed steel plates having adjacent seating surface portions located centrally and along the edges of the plates and registering recesses between said portions forming an annular gas passage, one of said plates having a bottom surface on the opposite side thereof from its said seating surface forming the outer end surface of the engine combustion chamber, said seating surface portions being joined by fused metal and having other registering recesses therein extending around the gas passage and forming a coolant jacket space therefor.

2. An engine cylinder head comprising a plurality of formed steel plates having adjacent seating surface portions disposed centrally and along the major portions of the edges of the plates and registering recessed portions intermediate the seating surface portions and forming an annular gas passage between the end plates and opening outwardly along one side of the plates, one of said plates having a bottom surface on the opposite side thereof from its said seating surface forming the outer end surface of the engine combustion chamber, said seating surface portions having registering recesses therein disposed around the annular gas passage and forming a coolant jacket space therefor and a fused metal joint between said seating surface portions.

3. An engine cylinder head comprising a plurality of superimposed formed steel plates having adjacent seating surface portions located centrally and along all but a portion of the edges of the plates and registering recessed portions intermediate the seating surface portions and forming an annular gas passage and a side opening leading outwardly between the end plates at one side thereof, one of said plates having a bottom surface on the opposite side thereof from its said seating surface forming the outer end surface of the engine combustion chamber, one of said end plates having a gas port therein opening into the annular gas passage, said seating surface portions having registering recesses therein and extending around the gas passage and port and forming a coolant jacket space therefor, said seating surface portions being joined by fused metal.

4. An engine cylinder head comprising a plurality of superimposed formed steel plates having adjacent seating surfaces disposed centrally and along the edges of the plates and registering recessed surface portions intermediate the seating surface portions and forming a generally annular gas passage, said seating surface portions being joined by fused metal, said central seating surface portions having aligned openings and means closing the aligned openings in the end plates to form a central coolant space for the annular gas passage, said edge seating surface portions having registering recesses therein extending around the gas passage and opening into the central coolant space.

5. An engine cylinder head comprising a plurality of superimposed formed steel plates having adjacent seating surface portions disposed centrally and along the edges of the plates and registering recesses therebetween forming an annular gas passage, said seating surface portions being joined by fused metal, said central seating surface portions having centrally disposed aligned openings extending axially therethrough, tubular means secured to the walls of the aligned openings in the end plates and extending in spaced relation through the aligned openings in the intermediate plates and forming an axial coolant space for the gas passage, one of said end plates having ports disposed around the central opening therein and opening into the gas passage, said seating surface portions along the edges of the plates having registering recesses therein communicating with axial coolant space and forming a coolant jacket space for the annular gas passage and ports.

6. A cylinder head for a fuel injection engine comprising a plurality of cast steel plates having adjacent seating surface portions disposed centrally and along the major portion of the edges of the plates and registering recesses therebetween and forming an annular gas passage, said seating surface portions being joined by fused metal in fluid tight relation, one of the end plates having gas ports therein opening into the annular gas passage, a valve seating surface formed in each port, valves cooperating with the seating surfaces, said central seating surface portions having axially aligned openings therein, a fuel injector mounting tube secured to the walls of the aligned openings in the end plates and in concentric relation with the walls of the aligned openings in the intermediate plates, said seating surface portions along the edges of said plates having registering recesses therein extending around the annular gas passage and ports and communicating with the aligned opening in the intermediate plates and forming a coolant jacket space for the gas passage and ports, each of said end plates having coolant openings communicating with the coolant jacket space for circulation of coolant therethrough.

7. An engine cylinder head for an internal combustion engine of the fuel injection type comprising a plurality of formed steel plates having adjacent seating surface portions disposed adjacent the center and along a portion of the edges and registering recessed portions intermediate thereof forming an annular gas passage and opening, said seating surface portions being joined by fused metal, the external surface of one of said plates forming the seating surface for the engine cylinder having ports opening into the annular gas passage, a valve seat formed in the wall of each port, valves cooperating with said valve seats, the central seating surface portions of the plates having axial aligned openings therein, a fuel injector mounting tube secured at the ends to the walls of the axial aligned openings in the opposite end plates and in concentric relation to the walls of the axial openings in the intermediate plates, a fuel injector seated in the injector mounting tube for injecting fuel outwardly of the external surface of the plate forming the seating surface for the engine cylinder, said seating surface portions along the edges of the plates having registering recesses extending around the annular gas passage and valve seats and forming a coolant jacket space therefor, and coolant holes in the end plates opening into the coolant jacket space for circulating coolant therethrough.

8. In an engine cylinder head comprising metal inner and outer end plates and intermediate plates in superimposed relation having adjacent seating surface portions provided with spaced sets of registering recesses forming a gas passage and a coolant passage intermediate the end plates, one of the end plates forming the wall of a pressure chamber and having at least one port opening into the gas passage, said end plates having openings communicating with the coolant passage, said intermediate plates having registering recesses in adjacent sides communicating with the gas passage, and fused metal means for joining the seating surface in sealing relation.

9. In an engine cylinder head comprising metal inner and outer end plates and intermediate plates in superimposed relation having adjacent seating surface portions provided with sets of concentrically disposed registering recesses forming a gas passage and a coolant passage intermediate the end plates, said end plates having openings communicating with the coolant passage, one of said end plates having a counterbore in the exterior face forming the wall of a combustion chamber, the bottom surface of said counterbore having a port opening into the gas passage, said other end plate having radial projections forming cylinder head hold-down means and said intermediate plates having registering side recesses communicating with the gas passage.

10. In an engine cylinder head comprising metal inner and outer end plates and intermediate plates in superimposed relation having adjacent seating surface portions provided with concentrically disposed sets of registering recesses forming a gas passage and a coolant passage between the end plates, said end plates having openings communicating with the coolant passage, one end plate having at least one gas port opening into the gas passage and provided with a valve seat, said other end plate having at least one valve stem opening aligned with the port valve seat and radial projections forming cylinder head hold-down means, a poppet valve having a seat cooperating with the port valve seat and a stem slidable in the valve stem opening, said intermediate plates having registering recesses in the sides thereof and communicating with the gas passage and fused metal means securing the adjacent seating surface portions of the plates in fluid sealing relation.

References Cited in the file of this patent

UNITED STATES PATENTS

| | | |
|---|---|---|
| 1,026,871 | Lake | May 21, 1912 |
| 1,479,129 | Feilner | Jan. 1, 1924 |
| 1,731,228 | Burtnett | Oct. 8, 1929 |
| 1,845,901 | Bassler | Feb. 16, 1932 |
| 1,984,101 | White | Dec. 11, 1934 |
| 2,021,942 | Loeffler | Nov. 26, 1935 |
| 2,199,423 | Taylor | May 7, 1940 |
| 2,622,579 | Westlake | Dec. 23, 1952 |

FOREIGN PATENTS

| | | |
|---|---|---|
| 794,336 | France | Dec. 12, 1935 |
| 161,198 | Great Britain | Apr. 14, 1921 |